(12) United States Patent
Dias et al.

(10) Patent No.: US 12,139,200 B2
(45) Date of Patent: Nov. 12, 2024

(54) FRONT-END STRUCTURE FOR A VEHICLE

(71) Applicant: Bayerische Motoren Werke Aktiengesellschaft, Munich (DE)

(72) Inventors: Oliver Dias, Munich (DE); Michael Plaum, Roehrmoos (DE); Roland Wanka, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 224 days.

(21) Appl. No.: 17/791,759

(22) PCT Filed: Dec. 14, 2020

(86) PCT No.: PCT/EP2020/086044
§ 371 (c)(1),
(2) Date: Jul. 8, 2022

(87) PCT Pub. No.: WO2021/139968
PCT Pub. Date: Jul. 15, 2021

(65) Prior Publication Data
US 2023/0052420 A1     Feb. 16, 2023

(30) Foreign Application Priority Data

Jan. 8, 2020    (DE) .................... 10 2020 100 202.5

(51) Int. Cl.
*B62D 25/02*     (2006.01)
*B60J 5/04*      (2006.01)
(Continued)

(52) U.S. Cl.
CPC ......... *B62D 21/152* (2013.01); *B62D 25/025* (2013.01); *B62D 25/04* (2013.01); *B62D 25/08* (2013.01)

(58) Field of Classification Search
CPC ...... B62D 25/20; B62D 25/025; B62D 25/04; B62D 25/08; B62D 27/023; B62D 21/152
(Continued)

(56) References Cited

U.S. PATENT DOCUMENTS 4,355,844 A * 10/1982 Fantini Muzzarelli ................... B62D 23/005
403/174
6,299,237 B1    10/2001 Benz et al.
(Continued)

FOREIGN PATENT DOCUMENTS

| CN | 1590187 A | 3/2005 |
|----|-----------|--------|
| CN | 1824563 A | 8/2006 |

(Continued)

OTHER PUBLICATIONS

Text JP2009184403 (Year: 2009).*
(Continued)

*Primary Examiner* — Dennis H Pedder
(74) *Attorney, Agent, or Firm* — Crowell & Moring LLP

(57) ABSTRACT

A front-end structure for a vehicle has a wheelhouse, a rocker panel, a support carrier which is connected to the wheelhouse and the rocker panel and which extends at an angle, an A-pillar, a door flange and a connecting portion connecting the A-pillar to the door flange. The connecting portion extends, at least in portions, substantially parallel to the support carrier.

9 Claims, 1 Drawing Sheet

(51) Int. Cl.
  *B62D 21/15* (2006.01)
  *B62D 25/04* (2006.01)
  *B62D 25/08* (2006.01)
(58) Field of Classification Search
  USPC ....... 296/23.01–23.3, 209, 193.06, 187.09, 1
  See application file for complete search history.

(56) References Cited

U.S. PATENT DOCUMENTS

| | | | |
|---|---|---|---|
| 2005/0046165 | A1 | 3/2005 | Gomi et al. |
| 2011/0127797 | A1* | 6/2011 | Garnett ................ B62D 25/025 |
| | | | 296/204 |
| 2012/0299334 | A1 | 11/2012 | Takayama et al. |
| 2016/0068199 | A1 | 3/2016 | Matthiessen et al. |
| 2016/0355215 | A1 | 12/2016 | Hartmann et al. |
| 2017/0203793 | A1 | 7/2017 | Nakamura et al. |
| 2019/0210653 | A1 | 7/2019 | Bokeloh et al. |
| 2020/0070897 | A1 | 3/2020 | Xiao et al. |

FOREIGN PATENT DOCUMENTS

| | | |
|---|---|---|
| CN | 105015623 A | 11/2015 |
| CN | 105228882 A | 1/2016 |
| CN | 105752163 A | 7/2016 |
| CN | 106240640 A | 12/2016 |
| CN | 108001537 A | 5/2018 |
| CN | 109789896 A | 5/2019 |
| DE | 10 2009 042 995 A1 | 3/2011 |
| DE | 10 2011 111 916 A1 | 6/2012 |
| DE | 10 2011 053 246 A1 | 3/2013 |
| DE | 10 2009 042 995 B4 | 2/2016 |
| DE | 10 2017 000 325 A1 | 7/2017 |
| DE | 10 2016 220 719 A1 | 4/2018 |
| EP | 1 059 220 A2 | 12/2000 |
| FR | 2 982 815 A1 | 5/2013 |
| JP | 2009-90915 A | 4/2009 |
| JP | 2009-113541 A | 5/2009 |
| JP | 2009184403 A * | 8/2009 |
| JP | 2013-1235 A | 1/2013 |
| JP | 2015-96350 A | 5/2015 |
| WO | WO 2011/118107 A1 | 9/2011 |

OTHER PUBLICATIONS

English translation of Chinese-language Office Action issued in Chinese Application No. 202080089419.2 dated Oct. 18, 2023 (6 pages).

International Search Report (PCT/ISA/210) issued in PCT Application No. PCT/EP2020/086044 dated Mar. 18, 2021 with English translation (five (5) pages).

English translation of Chinese-language Office Action issued in Chinese Application No. 202080089419.2 dated May 29, 2023 (6 pages).

* cited by examiner

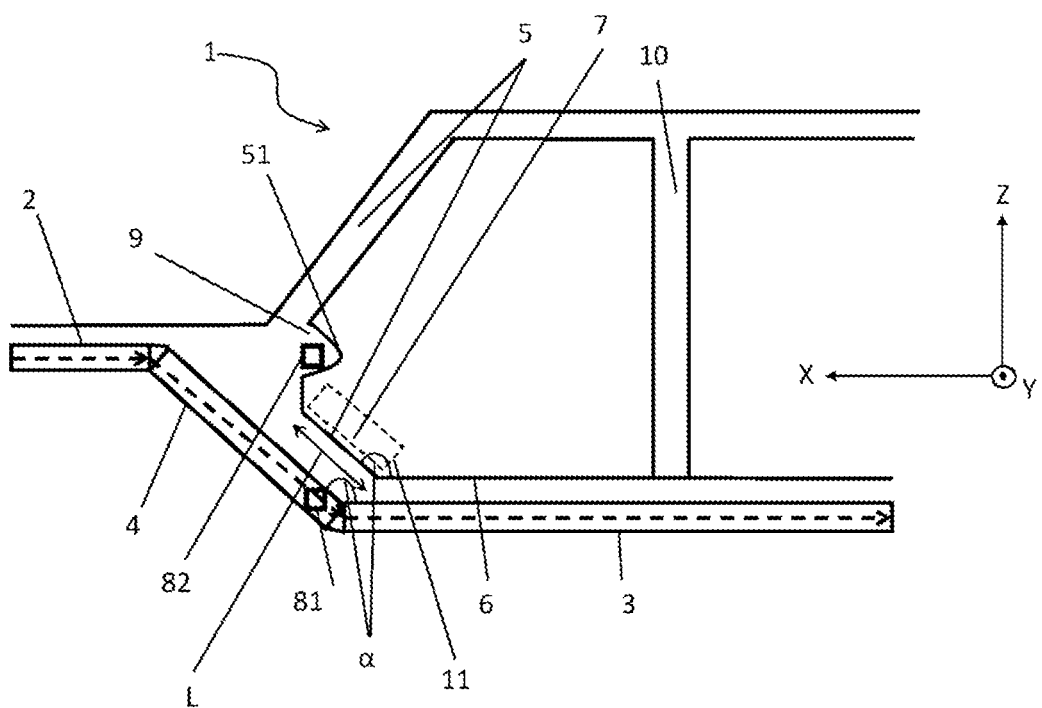

FRONT-END STRUCTURE FOR A VEHICLE

BACKGROUND AND SUMMARY

The present invention concerns a front-end structure for a vehicle.

Such a structure has a door entrance. The door entrance is situated in the side region of the vehicle and allows the driver, passenger and/or further vehicle occupants to embark and disembark.

A collision- or crash-optimized load path of the front-end structure runs through a support member, which is connected to a wheel housing of the front wheel, and through a sill of the vehicle, wherein these components together form an abutment. Here, it is advantageous that the load is introduced into the sill via the support member as flatly as possible, in order to achieve a homogenous load application to the sill and provide a support function in the case of a front-end lift.

The door entrance adjoins part of this abutment at the rear in the vehicle longitudinal direction, more precisely in the region in which the support member is connected to the sill. The door entrance in this region has a connecting portion which connects the entrance or door flange and an A-pillar of the vehicle.

Conventionally, the A-pillar runs above the connecting portion parallel to the vehicle vertical direction, and the door flange runs behind the connecting portion in the vehicle longitudinal direction, parallel to the vehicle longitudinal direction. Conventionally, the connecting portion, i.e. the part of the entrance region of the front door of the vehicle which is arranged at the bottom in the vehicle vertical direction and at the front in the vehicle longitudinal direction, has a rounding.

Because of the flat introduction of load to the sill via the support member, however, a space available in the entrance region is reduced towards the rear in the vehicle longitudinal direction.

In order to improve access ergonomics, the rounding of the door flange in the vehicle longitudinal direction should however be arranged as far forward as possible in the vehicle longitudinal direction. Moving the rounding forward, however, leads to a steeper course of the support member and hence to a poorer transfer of load to the sill.

This problem is aggravated in a vehicle with an alternative drive concept (e.g. an electric motor). Because of the absence of a comparatively large internal combustion engine and its necessary mechanisms, a passenger cell in a vehicle with electric motor may extend further forward in the vehicle longitudinal direction.

The object of the invention is therefore, inter alia, to overcome this disadvantage from the prior art, i.e. provide improved access ergonomics with good crash properties of the A-pillar.

This object is achieved according to the invention by the features of the independent claim. Advantageous embodiments are given in the subclaims.

The object is achieved by a front-end structure for a vehicle. The front-end structure has a wheel housing, a sill, an oblique support member which is connected to the wheel housing and the sill, an A-pillar, a door flange, and a connecting portion connecting the A-pillar to the door flange. The connecting portion runs at least in portions substantially parallel to the support member.

The vehicle may be an automobile. The vehicle may have an electric motor.

The front-end structure may be the part of the vehicle which is arranged in front of the (A-pillar and) B-pillar. The front-end structure may, in addition to the above-described components, comprise wheels, a hood, a front windshield, wheel suspension, etc.

The wheel housing may be the part of the front-end structure which is arranged above a front wheel of the vehicle in the vehicle vertical direction.

The sill may be a region of a (self-supporting) body of a vehicle. The sill may be arranged longitudinally below a door entrance, in particular below the door flange, between the wheel arches or wheel housings in the vehicle longitudinal direction. The door flange may be described as the lower part of the door entrance.

The support member may be arranged such that it encloses an obtuse angle with the sill which runs substantially parallel to the vehicle longitudinal direction, such that starting from the sill, the support member extends towards the front in the vehicle longitudinal direction and upward in the vehicle height direction.

The A-pillar may be the foremost load-bearing vehicle pillar in the vehicle longitudinal direction and connects a roof region of the vehicle to a body substructure of the vehicle, in particular the sill.

The connecting portion may be the part of the entrance region of the front door of the vehicle which is arranged at the bottom in the vehicle vertical direction and at the front in the vehicle longitudinal direction.

On a collision, in particular on a frontal crash, a load path may run from the wheel housing via the support member into the sill, i.e. may be formed by these components.

Because of the above-described front-end structure, an entrance region may be provided which at least partially follows the foot of a vehicle occupant and improves the access ergonomics in vehicles, in particular electric or hybrid vehicles.

The connecting portion may in particular have a length of at least 1 mm. Even such a length leads to a significant improvement in the access ergonomics.

The front-end structure may have a lower door hinge. The lower door hinge may be mounted level with the support member in the vehicle longitudinal direction. The door hinge may be a pivot joint (degree of freedom f=1) which is pivotable about an axis, in particular the axis running parallel to the vehicle vertical direction, and is configured to carry the vehicle door structure pivotably. The lower door hinge may be arranged below the connecting portion in the vehicle vertical direction.

Such a positioning of the lower door hinge avoids the need to move this forward in the vehicle longitudinal direction, even if the A-pillar is moved forward in the vehicle longitudinal direction in comparison with conventional door entrances.

More precisely, because of the above-described front-end structure, in comparison with conventional front-end structures, the A-pillar may be arranged further forward in the vehicle longitudinal direction, so that a distance between the A-pillar and the B-pillar becomes greater.

If, in comparison with conventional solutions, the lower door hinge is now moved downward, i.e. located at the above-described positions, the distance in the vehicle longitudinal direction from the lower door hinge to the B-pillar remains the same, and hence the lever of the door on the door hinge remains substantially the same.

Thus a load on the lower door hinge, caused by the door which may be mounted on the lower door hinge, also remains the same despite the improved access ergonomics.

Furthermore, because of the above-described positioning of the lower door hinge, an exchange with the location or position of a crash-support plate may be made and hence the access ergonomics further improved.

The front-end structure may have an upper door hinge. The upper door hinge may be mounted at the same level as the lower door hinge in the vehicle longitudinal direction. The upper door hinge may be arranged above the connecting portion in the vehicle vertical direction.

Such a positioning of the upper door hinge allows a distance between the upper and lower door hinges to remain comparatively large, despite the relocation of the A-pillar further forward, and hence a stable connection of a vehicle door via the hinge can be achieved.

Above the connecting portion in the vehicle vertical direction, the A-pillar may have an outward bulge towards the B-pillar in the vehicle longitudinal direction.

Thus, despite the relocation of the A-pillar further forward, a distance from the dashboard to the B-pillar in the vehicle longitudinal direction may remain substantially constant, so that fittings and instruments arranged in or on the dashboard remain in the vicinity of the driver and/or passenger.

To summarize, if the interior is moved forward, the door flange of the A-pillar is conventionally also moved forward until the rounding collides with the desired support member. The slope in the flange course, as provided according to the invention (instead of the conventional rounding), prevents this collision on further shifting of the A-pillar, and furthermore allows an ergonomically improved access because the A-pillar is situated further forward, and also leads to a better transfer of forces from the support member to the sill. The crash load is thus well transferred to the sill. Furthermore, by exchanging the position of the crash support with the position of the lower hinge (by moving the lower hinge downward and improving the door support basis), the access ergonomics are further improved.

An embodiment is described below with reference to FIG. 1.

BRIEF DESCRIPTION OF THE DRAWING

FIG. 1 is a schematic side view of a front-end structure according to the embodiment.

DETAILED DESCRIPTION OF THE DRAWING

FIG. 1 shows a front-end structure 1 of a motor vehicle. A Cartesian coordinate system is also depicted, wherein the vehicle longitudinal direction is designated X, the vehicle transverse direction Y, and the vehicle vertical direction Z.

The front-end structure 1 has a wheel housing 2 and a sill 3, which both run parallel to the vehicle longitudinal direction X. A support member 4 connects the wheel housing 2 and the sill 3 together. The support member 4 runs obliquely to the vehicle longitudinal direction X in a YZ plane. Arrows marked with dotted lines indicate a load path in the case of a crash, wherein the load path runs from the wheel housing 2 via the support member 4 to the sill 3.

Furthermore, the front-end structure 1 has a door entrance which in turn comprises an A-pillar 5, a door flange 6, a connecting portion 7 and a B-pillar 10.

The A-pillar 5 delimits the door entrance towards the front in the vehicle longitudinal direction X, and the B-pillar 10 delimits the door entrance towards the rear in the vehicle longitudinal direction X. The door flange 6 delimits the door entrance downward in the vehicle vertical direction Z (and a roof region delimits the door entrance upward in the vehicle vertical direction Z). The connecting portion 7 connects the A-pillar 5 to the door flange 6.

The connecting portion 7 and the support member 4 run parallel. They each enclose the same obtuse angle α with the vehicle longitudinal direction X. More precisely, the support member 4 encloses the angle α with the sill 3, and the connecting portion 7 also encloses the angle α with the door flange 6.

To achieve an improvement in access ergonomics, it may be sufficient for the connecting portion 7 to have a length L of 1 mm or more.

In the vehicle longitudinal direction X, a lower door hinge 81 for a (front) vehicle door (not shown) is arranged at the level of the support member 4. The lower door hinge 81 is arranged below the connecting portion 7 in the vehicle vertical direction Z.

The upper door hinge 82 is arranged above the lower door hinge 81 and the connecting portion 7 in the vehicle height direction Z. In the embodiment shown in FIG. 1, the upper door hinge 82 is furthermore arranged at the same level as the lower door hinge 81 in the vehicle longitudinal direction X. This means that a straight line running parallel to the vehicle vertical direction Z necessarily intersects the upper door hinge 82 if it intersects the lower door hinge 81, and vice versa.

In the portion adjoining the connecting portion 7, the A-pillar 5 runs parallel to the vehicle vertical direction Z. Then the A-pillar 5 has a outward bulge 51. The outward bulge 51 is arranged above the connecting portion 7 in the vehicle vertical direction Z. The bulge 51 extends towards the B-pillar 10 in the vehicle longitudinal direction X. In the region of the bulge, a dashboard 9 may be arranged.

The front-end structure 1 has been described above with reference to FIG. 1, which shows a view of the front-end structure 1 according to the embodiment from one side in the vehicle transverse direction Y. It is found that the opposite side of the front-end structure 1 in the vehicle transverse direction Y may have the same configuration, and the description above applies accordingly to this side.

With this front-end structure 1, an entrance region may be provided which follows a foot 11 of a vehicle occupant, illustrated schematically in FIG. 1, and improves the access ergonomics for vehicles.

LIST OF REFERENCE SIGNS

1 Front-end structure
2 Wheel housing
3 Sill
4 Support member
5 A-pillar
51 Outward bulge
6 Door flange
7 Connecting portion
81 Lower door hinge
82 Upper door hinge
9 Dashboard
10 B-pillar
11 Foot
L Length of connecting portion
α Obtuse angle
X Vehicle longitudinal direction
Y Vehicle transverse direction
Z Vehicle vertical direction

What is claimed is:

1. A front-end structure for a vehicle, comprising:
 a wheel housing;
 a sill;
 an oblique support member which is connected to the wheel housing and the sill;
 an A-pillar;
 a door flange;
 a connecting portion connecting the A pillar to the door flange, wherein the connecting portion extends at least in portions substantially parallel to the support member; and
 a lower door hinge mounted at a lower end of the support member.

2. The front-end structure according to claim 1, wherein the connecting portion has a length of at least 1 mm.

3. The front-end structure according to claim 1, wherein the lower door hinge is arranged below the connecting portion in a vehicle vertical direction.

4. The front-end structure according to claim 3, further comprising:
 an upper door hinge aligned with the lower door hinge.

5. The front-end structure according to claim 1, further comprising:
 an upper door hinge aligned with the lower door hinge.

6. The front-end structure according to claim 4, wherein the upper door hinge is arranged above the connecting portion in the vehicle vertical direction.

7. The front-end structure according to claim 5, wherein the upper door hinge is arranged above the connecting portion in the vehicle vertical direction.

8. The front-end structure according to claim 1, wherein above the connecting portion in a vehicle vertical direction, the A-pillar has an outward bulge towards the B-pillar in a vehicle longitudinal direction.

9. The front-end structure according to claim 6, wherein above the connecting portion in a vehicle vertical direction, the A-pillar has an outward bulge towards the B-pillar in a vehicle longitudinal direction.

* * * * *